(12) United States Patent
Taranagara Joga et al.

(10) Patent No.: US 10,414,368 B2
(45) Date of Patent: Sep. 17, 2019

(54) METHOD AND DEVICE FOR DETERMINING AN IMPACT LOCATION OF AN OBJECT ON A VEHICLE

(71) Applicant: Robert Bosch GmbH, Stuttgart (DE)

(72) Inventors: Prakasha Taranagara Joga, Bangalore (IN); Marlon Ramon Ewert, Untergruppenbach (DE); Gunther Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 15/127,938

(22) PCT Filed: Feb. 27, 2015

(86) PCT No.: PCT/EP2015/054198
§ 371 (c)(1),
(2) Date: Sep. 21, 2016

(87) PCT Pub. No.: WO2015/161947
PCT Pub. Date: Oct. 29, 2015

(65) Prior Publication Data
US 2017/0096117 A1    Apr. 6, 2017

(30) Foreign Application Priority Data
Apr. 23, 2014 (DE) .......................... 10 2014 207 626

(51) Int. Cl.
*B60R 21/0136* (2006.01)
*B60R 21/02* (2006.01)
(Continued)

(52) U.S. Cl.
CPC .......... *B60R 21/0136* (2013.01); *B60R 21/02* (2013.01); *G01L 5/0052* (2013.01);
(Continued)

(58) Field of Classification Search
None
See application file for complete search history.

(56) References Cited

U.S. PATENT DOCUMENTS 5,447,315 A * 9/1995 Perkins .................... F41J 5/056
                                                                 273/348
6,005,479 A * 12/1999 Ide ....................... B60R 21/0132
                                                                 180/282
(Continued)

FOREIGN PATENT DOCUMENTS

DE      102005014241 A1    10/2006
JP         2002178872 A     6/2002

OTHER PUBLICATIONS

Kaplan, Wiley Electrical and Electronics Engineering Dictionary, IEEE (2004), p. 388.*
(Continued)

*Primary Examiner* — Kevin P Mahne
(74) *Attorney, Agent, or Firm* — Norton Rose Fulbright US LLP; Gerard Messina

(57) ABSTRACT

A method for determining an impact location of an object on a vehicle including reading in a first sensor signal value of a first sensor of the vehicle at a predefined first point in time, a second sensor signal value of the first sensor at a predefined second point in time following the first point in time, and a sample value of a second sensor of the vehicle at a third point in time following the second point in time. Additionally, an interpolation point is calculated from the first sensor signal value and the second sensor signal value by using the sample value, at least one component of the interpolation point corresponding to the sample value. A time lag between an interpolation instant assigned to the interpolation point, and the third point in time takes place. Finally, the time lag is used for determining the impact location of the object.

22 Claims, 7 Drawing Sheets

(51) Int. Cl.
*G01L 5/00* (2006.01)
*B60R 21/01* (2006.01)
*F41J 5/04* (2006.01)
*F41J 5/06* (2006.01)
*F41J 5/08* (2006.01)
*G01L 1/16* (2006.01)

(52) U.S. Cl.
CPC ............. *B60R 2021/01013* (2013.01); *B60R 2021/01286* (2013.01); *F41J 5/04* (2013.01); *F41J 5/06* (2013.01); *F41J 5/08* (2013.01); *G01L 1/16* (2013.01)

(56) References Cited

U.S. PATENT DOCUMENTS

| | | | | |
|---|---|---|---|---|
| 6,330,500 | B1* | 12/2001 | Moriyama | B60R 21/013 180/232 |
| 6,561,301 | B1* | 5/2003 | Hattori | B60R 21/0136 180/274 |
| 7,036,621 | B2* | 5/2006 | Takafuji | B60R 21/0136 180/274 |
| 8,428,862 | B2* | 4/2013 | Mase | B60R 19/18 180/271 |
| 9,457,752 | B2* | 10/2016 | Okamura | B60R 21/0132 |
| 9,651,343 | B2* | 5/2017 | Miller | F41J 5/06 |
| 2001/0043011 | A1* | 11/2001 | Ugusa | B60R 21/0132 307/10.1 |
| 2007/0027584 | A1* | 2/2007 | Hau | B60R 21/0136 701/1 |
| 2007/0157700 | A1* | 7/2007 | Dukart | B60R 21/013 73/12.09 |
| 2007/0235996 | A1* | 10/2007 | Huh | B60R 21/0136 280/735 |
| 2009/0088921 | A1* | 4/2009 | Huh | B60R 21/0136 701/31.4 |
| 2009/0204294 | A1* | 8/2009 | Mack | B60R 21/013 701/45 |
| 2010/0191401 | A1* | 7/2010 | Mack | B60R 21/0132 701/31.4 |
| 2010/0198528 | A1* | 8/2010 | McCauley | A63B 24/0021 702/41 |
| 2011/0004360 | A1* | 1/2011 | Kolatschek | B60R 21/0136 701/1 |
| 2012/0078499 | A1* | 3/2012 | Park | B60R 21/34 701/301 |
| 2012/0218204 | A1* | 8/2012 | Kim | G06F 3/043 345/173 |
| 2012/0310485 | A1* | 12/2012 | Lang | B60R 21/0132 701/46 |
| 2013/0193645 | A1* | 8/2013 | Kazakov | F41J 5/06 273/372 |
| 2014/0207330 | A1* | 7/2014 | Meir | B60R 21/0136 701/33.9 |
| 2014/0367918 | A1* | 12/2014 | Mason | F41J 5/04 273/371 |
| 2015/0051009 | A1* | 2/2015 | Davenport | A61B 5/11 473/223 |
| 2015/0123346 | A1* | 5/2015 | Mason | F41J 1/10 273/371 |
| 2015/0274119 | A1* | 10/2015 | Schondorf | B60R 19/483 293/132 |
| 2015/0291122 | A1* | 10/2015 | Seo | B60R 19/483 701/45 |
| 2016/0091285 | A1* | 3/2016 | Mason | F41J 5/04 273/372 |
| 2016/0229339 | A1* | 8/2016 | Funayama | B60R 21/013 |
| 2016/0370156 | A1* | 12/2016 | Elizondo | F41J 5/056 |
| 2017/0083164 | A1* | 3/2017 | Sheng | G06F 3/0433 |

OTHER PUBLICATIONS

International Search Report dated May 21, 2015, of the corresponding International Application PCT/EP2015/054198, filed on Feb. 27, 2015.

* cited by examiner

METHOD AND DEVICE FOR DETERMINING AN IMPACT LOCATION OF AN OBJECT ON A VEHICLE

FIELD

The present invention relates to a method for determining an impact location of an object on a vehicle, to a corresponding device, and to a corresponding computer program product.

BACKGROUND INFORMATION

An evaluation of signal differences between two or more sensors may play an important role in different subareas of an activation of passive restraint devices for vehicles. This relates, for example, to pedestrian detection with the aid of acceleration sensors, pedestrian detection with the aid of a pressure tube sensor system, crash-type identification of frontal crashes with the aid of upfront sensors, or crash-type identification of frontal crashes with the aid of lateral sensors measuring in the longitudinal direction of a vehicle.

In this case, the signal differences may be evaluated on the basis of amplitude or transit time.

SUMMARY

Against this background, the approach presented here provides a method for determining an impact location of an object on a vehicle, and a device which utilizes this method, and, finally, a corresponding computer program product according to the main claims. Advantageous embodiments result from the description herein.

A method for determining an impact location of an object on a vehicle is described, the method including the following steps:

reading in a first sensor signal value from a first sensor of the vehicle at a predefined first point in time, a second sensor signal value from the first sensor at a predefined second point in time following the first point in time, and a sample value from a second sensor of the vehicle at a third point in time following the second point in time;

calculating an interpolation point on the basis of the first sensor signal value and the second sensor signal value by using the sample value, at least one component of the interpolation point corresponding to the sample value;

ascertaining a time lag between an interpolation instant assigned to the interpolation point, and the third point in time; and using the time lag for determining the impact location of the object.

An impact location may be understood to be an area of a vehicle, which is impacted by an object in the event of a collision of the vehicle with the object. An object may be understood to be a collision opponent of the vehicle. For example, the object may be a pedestrian, a further vehicle, or an obstacle. A vehicle may be understood to be a motor vehicle such as, for example, a passenger car or a truck. A sensor signal value and a sample value may be understood to be a piece of information regarding a physical variable which is sensed by a first or a second sensor of the vehicle in at least one certain direction. For example, the sensor signal value may represent a pressure, a force, an acceleration, or a similar physical variable. The sensor signal value to be read in may have already been preprocessed, for example, filtered or converted for normalization. In this case, a preprocessing unit may also be provided, which is assigned to the sensor and carries out the relevant preprocessing of the sensor signal. Alternatively, the preprocessing may also take place only in the processing unit. A sensor may be understood to be, for example, an acceleration sensor or a pressure sensor. An interpolation point may be understood to be a value or a tuple which represents a physical variable which lies between a physical variable of the first sensor signal value and a physical variable of the second sensor signal value. The interpolation point may represent a relative pressure at a certain point in time. The interpolation point may be mapped with the aid of interpolation on the basis of the first and the second sensor signal value and by using the sample value. One component of the interpolation point may correspond to the sample value. An interpolation instant, which may lie between the first and the second point in time, may be assigned to the interpolation point. The impact location may be determined by using a time lag between the interpolation instant and the third point in time. The time lag may be a transit time difference between a sensor signal from the first sensor and a sensor signal from the second sensor. With the aid of the transit time difference, a relative distance, for example, of the object from the first sensor and the second sensor during the impact of the object on the vehicle may be ascertained.

The present approach is based on the finding that a transit time difference between a signal from a first vehicle sensor and a signal from a second vehicle sensor may be ascertained with great accuracy by interpolating an additional signal value from the first vehicle sensor on the basis of two sampled signal values from the first vehicle sensor by using a sampled signal value from the second vehicle sensor. By using this additional signal value, the transit time difference may be ascertained for a time period which lies between predefined sampling instants of the sampled signal values. Rasters, which may result in the case of conventional measuring methods having fixed thresholds and which may influence a measuring accuracy, may therefore be avoided, and reproducible results for different signal amplitudes may be determined.

In addition, it is possible to highly precisely and reliably determine, for example, an impact location of a pedestrian, e.g., by using pressure tube sensors, or a crash type in the event of frontal collisions, e.g., by using upfront sensors or peripheral x-sensors, with the aid of such a transit time-based method. Therefore, a triggering performance of available vehicle occupant protection systems and pedestrian protection systems of a vehicle may also be improved and accidental deployments may be minimized. Furthermore, active restraint devices may be specifically fired as a function of the transit time difference.

One specific embodiment of the approach presented here, in which the third point in time is not predefined, but rather results from the present value from the second sensor, is favorable when this value falls between the two sensor signal values from the first sensor. For this purpose, the sensor signal values from the first sensor are buffered and the sample value is compared to these. The determination of the sample value therefore takes place dynamically.

According to one specific embodiment of the present approach, in the step of ascertaining, initially a first period of time between the second point in time and the third point in time, and a second period of time between the interpolation instant and the second point in time are determined and, subsequently, the first period of time is linked to the second period of time in order to ascertain the time lag. For example, the first period of time may be ascertained by forming a difference from the second point in time and the third point in time. The first period of time and the second period of time may then be added to one another in order to ascertain the time lag. This specific embodiment offers the advantage of a robust, accurate, and rapid calculation of the time lag.

Furthermore, in the step of ascertaining, the time lag may be ascertained by using a first ratio of a difference value formed from the second sensor signal value and the sample value with respect to the difference value of the second and the first sensor signal values, and/or by using a second ratio of a period of time between the interpolation instant and the second point in time with respect to a period of time between the first point in time and the second point in time. The first ratio may correspond to the second ratio in this case. With the aid of this specific embodiment, the interpolation value may be ascertained rapidly and reliably from merely a small number of sampled sensor values.

According to one further specific embodiment of the present approach, in the step of ascertaining, a time lag between the interpolation instant and the second point in time is determined as an integral multiple of one grid interval in order to ascertain the time lag. A time lag between the first point in time and the second point in time may be subdivided into a predefined number of grid intervals in this case. A grid interval may be understood to be a predefined substep of a time period. The time lag may represent a maximum number of grid intervals in this case. This specific embodiment offers the advantage of a particularly accurate calculation of the time lag between the interpolation instant and the second point in time.

In addition, a step of detecting a predefined threshold value being exceeded by a signal value from the first sensor and/or a signal value from the second sensor may be provided. In the step of reading in, the first sensor signal value and/or the second signal value and/or the sample value may be read in, in response to the detection of the threshold value being exceeded. A threshold value may be understood to be a value representing a physical variable, starting at which a signal value from the first and/or the second sensor is detected as a physical variable representing an impact of the object. A signal value may be understood to be a value of a signal from the first or the second sensor representing a physical variable. The threshold value may be selected to be particularly low. For example, the threshold value may be predefined as a function of a limit predefined by a noise from the first or the second sensor. With the aid of the threshold value, a reliable detection of an impact of the object on the vehicle may be ensured even in the case of low signal strengths. The time lag may therefore be ascertained already at the beginning of an impact.

A step of storing a sensor signal reference value at a predefined reference point in time, which precedes the first point in time, may be provided in this case. The sensor signal reference value may represent a signal value from the first sensor, which lies below the threshold value. In the step of reading in, the first sensor signal value and/or the second sensor signal value may be read in by using the sensor signal reference value. The purpose of the sensor signal reference value may be considered to be, in particular, that a value pair of the first sensor may be ascertained for every value of the second sensor.

In addition, the execution of at least one step of the method may be aborted and/or prevented when at least one predefined abort criterion has been met. An abort criterion may be understood to be, for example, the attainment of a predefined abort value by the first sensor signal value, the second sensor signal value, and/or the sample value, the attainment of a predefined maximum value of the time lag or the expiration of a predefined method duration. In addition, an abort may take place when the second signal has higher values than the first signal. A duration of the method may be kept preferably short with the aid of this specific embodiment.

With regard to an impact on the vehicle, the precise impact location on the vehicle may be determined depending on the ascertained time difference. Therefore, a more rapid and reliable impact detection may be implemented.

According to one further specific embodiment, in a step of changing, a triggering threshold for triggering an occupant protection device of the vehicle may be changed as a function of the time lag and/or the impact location. An occupant protection device may be understood to be, for example, an airbag, which may be deployed inside or outside the vehicle, a seat belt tightener, or a raisable engine hood. With the aid of this specific embodiment, a protective effect of the occupant protection device may be flexibly adapted to a location or a severity of the impact and, therefore, a risk of injury to vehicle occupants or pedestrians may be reduced.

The method may include a step of providing an activation signal for activating at least one occupant protection devices of the vehicle as a function of the time lag and/or the impact location. An occupant protection device may be understood to be an occupant protection device such as, for example, an airbag, which may be deployed inside or outside the vehicle, a seat belt tightener, or a raisable engine hood. Due to the activation signal, a preferably rapid and targeted activation of the occupant protection device may be ensured. In addition, accidental deployments of the occupant protection device may be minimized.

Furthermore, in the step of reading in, a third sensor signal value of the first sensor may be read in at the third point in time and a further sample value of the second sensor may be read in at a fourth point in time following the third point in time. In the step of calculating, a further interpolation value may be interpolated on the basis of the second sensor signal value and the third sensor signal value by using the further sample value. The further interpolation value may correspond to the further sample value. In the step of ascertaining, a further time lag between a further interpolation instant, which is assigned to the further interpolation value, and the fourth point in time may be ascertained. Finally, in the step of determining, the impact location may be furthermore determined by using at least the further time lag. Further time lags may be determined in a similar way. The impact location of the object may be ascertained with particularly high accuracy and reliability by determining multiple time lags between two sensor signals.

In order to provide for a preferably rapid and efficient ascertainment of the impact location, a mean and/or a maximum value may be determined at least from the time lag and the further time lag, in the step of ascertaining. A mean may be understood to be, for example, a median, an arithmetic mean, or a geometric mean.

The approach presented here furthermore provides a device which is designed for carrying out or implementing the steps of one variant of a method presented here in corresponding units. The object of the present invention may also be rapidly and efficiently achieved with the aid of this embodiment variant of the present invention in the form of a device.

A device may be understood in this case to be an electrical device which processes sensor signals and outputs control signals and/or data signals as a function thereof. The device may include an interface which may be designed as hardware and/or software. In the case of an embodiment as hardware, the interfaces may be part of a so-called system ASIC, for example, which contains highly diverse functions of the device. It is also possible, however, that the interfaces are standalone, integrated circuits or are formed, at least in part, from discrete components. In the case of an embodiment as software, the interfaces may be software modules, which are present, for example, on a microcontroller in addition to other software modules.

In addition, a computer program product or a computer program including program code is advantageous, which may be stored on a machine-readable carrier or memory medium such as a semiconductor memory, a hard drive memory or an optical memory, and which may be used for carrying out, implementing, and/or controlling the steps of the method according to one of the above-described specific embodiments, in particular when the program product or program is carried out on a computer or a device.

The approach presented here is explained in greater detail in the following with reference to the figures.

DETAILED DESCRIPTION OF EXAMPLE EMBODIMENTS

Figure 1:
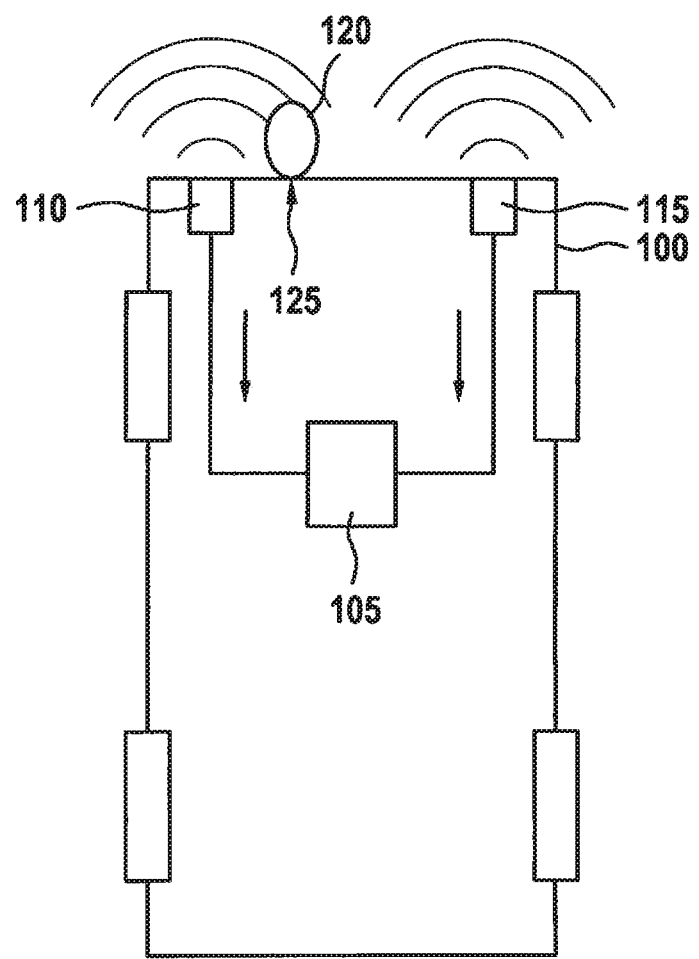
FIG. 1 shows a schematic representation of a vehicle including a device according to one exemplary embodiment of the present invention.

In the following description of favorable exemplary embodiments of the present invention, identical or similar reference numerals are used for the similarly functioning elements represented in the different figures, a repeated description of these elements being dispensed with.

FIG. 1 shows a schematic representation of a vehicle 100 including a device 105 according to one exemplary embodiment of the present invention. Vehicle 100 is equipped with a first sensor 110 and a second sensor 115. Sensors 110, 115 are attached on opposite sides of a front end of vehicle 100, by way of example. Alternatively or additionally, signals from further sensors (which are not depicted in FIG. 1) may also be used. Device 105 is connected to sensors 110, 115. An object 120 is located ahead of vehicle 100. Vehicle 100 is about to collide with object 120.

First sensor 110 is designed for providing a first sensor signal in response to a collision of vehicle 100 with object 120. Second sensor 115 is designed for providing a second sensor signal in response to the collision. Device 105 is designed for calculating an interpolation value by using signal values of the first and the second sensor signals and for ascertaining a transit time difference between the first and the second sensor signals by using the interpolation value. Finally, device 105 is designed for determining an impact location 125 of object 120 as a function of the transit time difference. Finally, the transit time difference is used for improving the triggering performance of the main algorithm and, finally, for activating occupant protection device. In FIG. 1, a distance between first sensor 110 and impact location 125 is smaller than a distance between second sensor 115 and impact location 125.

One exemplary embodiment of the present invention provides an adaptive measurement of a transit time difference between two sensor signals for ascertaining an impact location in the event of an accident with a pedestrian or a collision with a vehicle. The impact location ascertained in this way may be used, for example, by a pedestrian protection algorithm.

For example, a pedestrian, as object 120, may be detected with the aid of acceleration sensors 110, 115. In this case, two or more acceleration sensors 110, 115, which are referred to as pedestrian collision sensors, or PCS, are generally mounted in the bumper cover of vehicle 100. Sensors 110 close to impact location 125 of object 120 measure a signal which is stronger and is launched sooner than is the case for sensors 115 located further away, so that an impact position 125 of object 120 on the bumper may be ascertained from the signal differences. On the basis of impact position 125 which is ascertained in this way, a discrimination between pedestrians and non-triggering objects may be optimized.

A pedestrian detection system may be implemented with the aid of a pressure tube sensor system. A pressure tube sensor, or PTS, is usually located between a bumper cross-member and a foam in front of it of vehicle 100. The pressure tube sensor may be filled with air and may be closed at its ends by a pressure sensor 110, 115, respectively. Collisions with a pedestrian 120 may be detected due to a deformation of the pressure tube and may be detected as a pressure signal in pressure sensors 110, 115. While both pressure sensors 110, 115 measure a similar signal in the case of impacts in the middle, transit time differences occur in the case of impacts which are not located in the middle, due to different path lengths which the pressure wave must travel to each sensor 110, 115. Pressure sensor 110 facing an impact location 125 therefore measures a signal which is launched sooner. Furthermore, a signal shape may also differ between both sensors.

A crash-type identification of frontal crashes may be implemented with the aid of two upfront sensors 110, 115. Upfront sensors 110, 115, or UFS, may be acceleration sensors which measure in the longitudinal direction and are mounted in a crumple zone of vehicle 100. Acceleration sensors 110, 115 may be installed, for example, on a headlight mounting, on a bending cross member, or on a radiator support. The acceleration sensors assist in the detection of frontal crashes, which is carried out primarily based on a sensor system located behind the crumple zone. In the case of two upfront sensors 110, 115, which are symmetrically installed on either side of the crumple zone, a crash type such as a collision extending across the entire front of the vehicle, a collision offset to the left or a collision offset to the right may be ascertained by comparing the two sensor signals. A triggering decision of a central airbag control unit may be optimized on the basis of the crash type ascertained in this way. In particular, suitable restraint device may be triggered only in the event of an offset collision, such as, for example, a head airbag facing the collision in order to prevent contact by an occupant with the A-pillar of vehicle 100.

Furthermore, two lateral sensors measuring in the longitudinal direction may be used for the crash-type identification of frontal crashes. Acceleration sensors measuring in the y-direction are frequently installed on a lateral vehicle periphery, e.g., on the B-pillars, for the purpose of sensing a side-on collision. A further x-channel may be added to these acceleration sensors. Independently thereof, peripheral x-sensors, which are also referred to as a peripheral acceleration sensor-x, or PAS-x, may be installed. Similarly to the crash-type identification by upfront sensors 110, 115, a crash type may be ascertained by comparing these sensors on the left and the right sides of the vehicle and, therefore, a triggering decision of a central airbag control unit may be optimized in order to activate suitable restraint devices.

Figure 2:
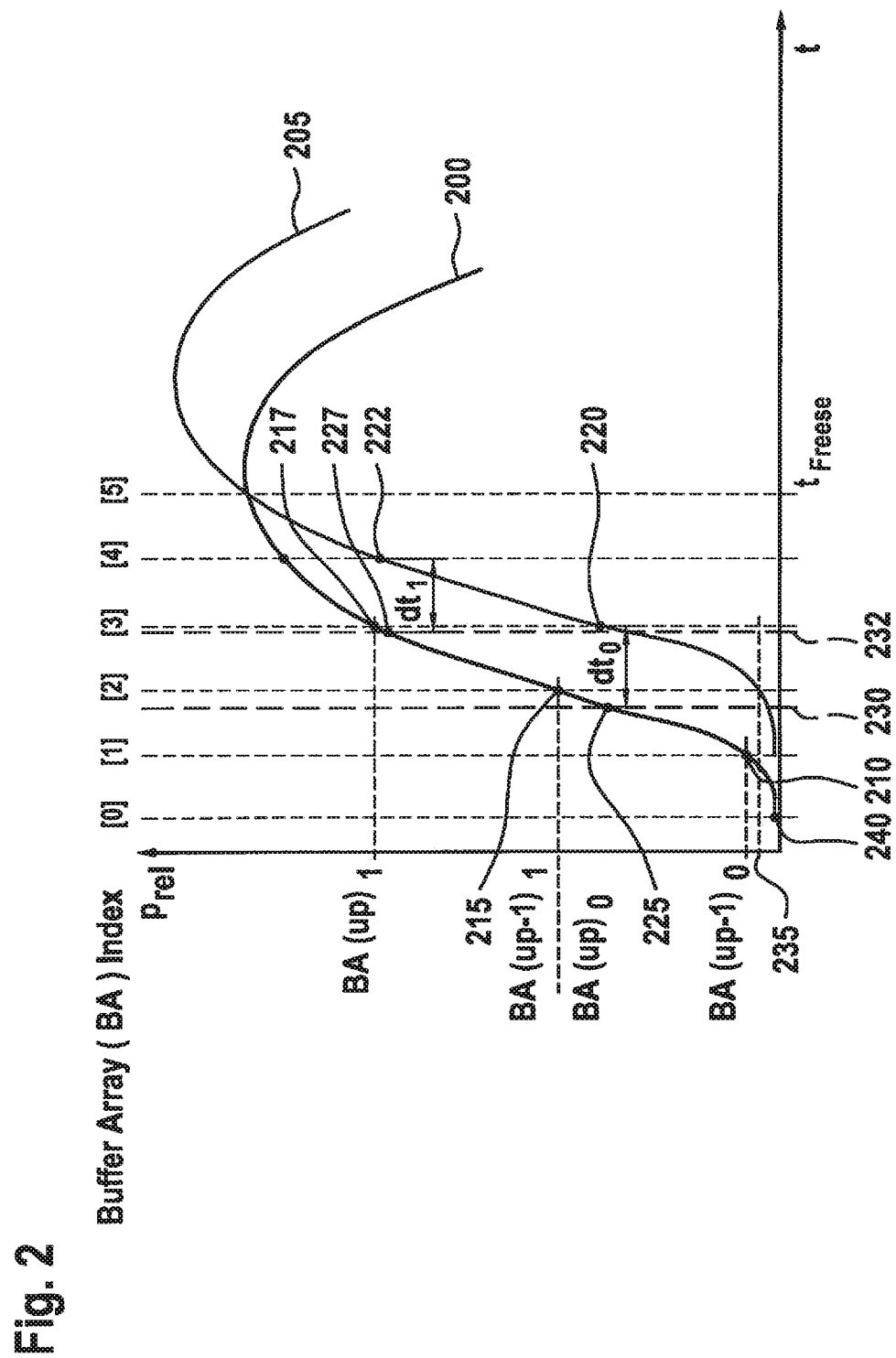
FIG. 2 shows a diagram for depicting a first sensor signal and a second sensor signal for use in a method according to one exemplary embodiment of the present invention.

FIG. 2 shows a diagram for depicting a first sensor signal 200 and a second sensor signal 205 for use in a method according to one exemplary embodiment of the present invention. For example, first sensor signal 200 is the left sensor signal output by sensor 110 shown in FIG. 1, and second sensor signal 205 is the right sensor signal output by sensor 115 shown in FIG. 1. The diagram represents a physical variable of sensor signals 200, 205 as a function of a curve over time. The physical variable is a relative pressure $p_{rel}$, by way of example. Sensor signals 200, 205 each have a curved shape of the curve over time, including a rising curve section and a falling curve section, which adjoins the rising curve section. Sensor signal 205 follows sensor signal 200 with respect to time.

The diagram is subdivided into six grid lines, by way of example, which extend in parallel to the y-axis of the diagram. The grid lines correspond to predefined sampling instants at which sensor signals 200, 205 are sampled in order to obtain corresponding signal values. A spacing between two grid lines corresponds to a duration of 500 µs, for example. This time period may also be referred to as an algorithm cycle.

A first sensor signal value 210, a second sensor signal value 215, and a third sensor signal value 217 are each marked with a point, by way of example, on the rising curve section of first sensor signal 200. First sensor signal value 210 lies on a grid line 1 which corresponds to a first sampling instant, second sensor signal value 215 lies on a grid line 2 which corresponds to a second sampling instant following the first sampling instant, and third sensor signal value 217 lies on a grid line 3 which corresponds to the third sampling instant following the second sampling instant.

These values from the first sensor are buffered in order to be subsequently compared with the sample values from the second sensor. The memory for the values from the first sensor is referred to in the following as a buffer array. The positions in the memory itself are referred to as a buffer array index.

A sample value 220 and a further sample value 222 are each marked with a point, by way of example, on the rising curve section of second sensor signal 205. As viewed in the y-direction, sample value 220 lies between first sensor signal value 210 and second sensor signal value 215, and further sample value 222 lies between second sensor signal value 215 and third sensor signal value 217. The assignment of the sample values of the second sensor to a sensor signal value pair of the first sensor is dynamically ascertained. The sample value falls between two sensor signal values from the first sensor in this case. In this example, sample value 220 lies between first sensor signal value 210 and second sensor signal value 215 of the first sensor. In addition, further sample value 222 lies between second sensor signal value 215 and third sensor signal value 217 of the first sensor. The sensor signals of the first sensor must therefore be buffered in order to ascertain sample values 220 and 222. In the present example, sample value 220 lies on grid line 3 with respect to time, and further sample value 222 lies on a grid line 4 with respect to time. In fact, the sample values may also be reached sooner or only later (the defining property of these sample values is that they lie between the corresponding sensor signal values of the first sensor). For each sample value of the second sensor, a corresponding value pair of the first sensor, between which the sample value lies, may be ascertained. Conversely, however, it is not ensured that a sample value of the second sensor also exists for each sensor signal value pair of the first sensor. Therefore, the interpolation described in the following is always carried out starting from the sample value of the second sensor.

An interpolation point 225 and a further interpolation point 227 are also indicated, by way of example, on the rising curve section of first sensor signal 200. In this case, interpolation point 225 lies on an interpolation line, which lies between grid line 1 and grid line 2 and corresponds to an interpolation instant 230, and further interpolation point 227 lies on a further interpolation line, which is situated between grid line 2 and grid line 3 and corresponds to a further interpolation instant 232. As viewed in the y-direction, interpolation point 225 corresponds to sample value 220 and further interpolation point 227 corresponds to further sample value 222.

Interpolation value 225 is interpolated on the basis of first sensor signal value 210 and second sensor signal value 215 by using sample value 220. Further interpolation point 227 is interpolated on the basis of second sensor signal value 215 and third sensor signal value 217 by using further sample value 222.

A time lag $dt_0$ between interpolation instant 230 and grid line 3, and a further time lag $dt_1$ between further interpolation instant 232 and grid line 4 are each indicated by a double arrow.

Furthermore, a sensor signal reference value 240 is marked on the rising curve section of first sensor signal 200. Sensor signal reference value 240 lies on a grid line 0 which corresponds to a reference instant preceding the first sampling instant.

A threshold value 235 is marked by a line extending in parallel to the x-axis Threshold value 235 may also be referred to as a start threshold. Threshold value 235 lies between sensor signal reference value 240 and first sensor signal value 210.

The curves of sensor signals 200, 205 intersect on a grid line 5 which corresponds to a fifth sampling instant following the fourth sampling instant.

According to one exemplary embodiment of the present invention, the time periods predefined by grid lines 0 through 5 are subdivided into a predefined number of substeps. In this case, the interpolation instant represents an integral multiple of such a substep. By way of example, in FIG. 2, one substep corresponds to one-sixteenth of the interval between two grid lines, i.e., given an interval of 500 µs, one substep corresponds to a duration of 31.25 µs.

According to a further exemplary embodiment of the present invention, an essential functional principle of a method for determining a transit time difference between two signals 200, 205 for detecting an impact location is based on a low start threshold 235 for an initial measurement of the transit time difference. This start threshold 235 may be selected to be so low that it lies in a lower area of a rising edge of the signals for all relevant signals to be differentiated. A lower limit for this threshold 235 may be given by sensor properties such as, for example, noise.

When start threshold 235 is exceeded by a sensor, the discrete signal values from the first sensor, for example from sensor 110 shown on the left in FIG. 1, are buffered in every cycle. In addition, the last value of first sensor 110 is also buffered, as sensor signal reference value 240, before start threshold 235 is exceeded. As soon as second signal 205 has also exceeded start threshold 235, a transit time measurement takes place in every algorithm cycle, in that an instantaneous value of a late signal 205 is compared with buffered values of an early signal 200 and, on the basis thereof, a transit time difference between the two signals is calculated. In this example, the early signal is given by the left sensor and the late signal is given by the right sensor. The determination of the early sensor takes place dynamically, however, depending on which sensor signal is the first to exceed the start threshold.

With reference to FIG. 2, this means that an instantaneous value 220 of right signal 205 is compared with buffered values 210, 215 of left signal 200. The two values 210, 215 of left signal 200, between which right signal 205 lies with respect to its amplitude, are ascertained in this way for first value 220 of right signal 205. Value 210 lies in the buffer array at point $BA(up-1)_0$ and has value $p_{relLeft}[BA(up-1)_0]$, and value 215 lies in the buffer array at point $BA(up)_0$ and has value $p_{relLeft}[BA(up)_0]$.

Since the first entry contained in the buffer array is the last value 240 of left signal 200 before start threshold 235 is exceeded, it is ensured that value pair $BA(up)_1$ and $BA(up-1)_1$ may always be determined.

A calculation instruction for ascertaining a transit time difference $dt_1$ is defined, according to one exemplary embodiment of the present invention, as:

$$dt_1 = \left( \frac{(p_{relLeft}[BA(up)_{(1)}] - p_{relRight_{(1)}}) \cdot 16}{p_{relLeft}[BA(up)_{(1)}] - p_{relLeft}[BA(up-1)_{(1)}]} \right) + $$
$$((\text{Index}(i) - BA(up)_{(1)}) \cdot 16)$$

In this case, $p_{relLeft}$ represents a value of first sensor signal 200 and $P_{relRight}$ represents a value of second sensor signal 205. Index stands for a predefined grid line.

The ascertainment of transit time difference $dt_0$ takes place in two steps. In a first step, the calculation of a number of whole cycles takes place. In this case, the whole cycles are ascertained from the present cycle to cycle $BA(up)_1$. This corresponds to a second part of the calculation instruction. The interpolation of a last subcycle between interpolation instant 225 and grid line 2 takes place in a second step. This corresponds to a first part of the calculation instruction. An accuracy is one-sixteenth of an algorithm cycle in this case, by way of example.

A calculation of $dt_1$ takes place similarly, in that a value of right signal 205 is compared again with buffered values of left signal 200. The two values 215 and 217, between which instantaneous value 222 of right signal 205 is present, are extracted at point $BA(up-1)_1$ and $BA(up)_1$, respectively.

The ascertainment of transit time difference $dt_1$ then takes place, in turn, according to the aforementioned calculation instruction.

According to one exemplary embodiment of the present invention, the aforementioned calculation instruction yields a quantity $\{dt_0, dt_1, dt_2 \ldots\}$ having a large number of transit time differences. For a calculation of algorithm functions, i.e., in order to change thresholds for a triggering decision as a function of an impact location, the calculation of the transit time difference should be concluded after a preferably short time. Therefore, multiple abort conditions may be provided.

For example, a second fixed threshold may be provided above start threshold 235 in order to abort or prevent the execution of a step of the method. Such an abort threshold may be relatively inflexible, however, which affects different signal amplitudes. In addition, such an abort threshold possibly may not be reached by weak signals.

A further abort criterion may be time-based. In this case, the calculation of the transit time differences ends after a defined number of cycles.

In addition, a maximum transit time difference between the two signals 200, 205 from the quantity $\{dt_0, dt_1, dt_2 \ldots\}$ may be used as the abort condition.

An uppermost abort criterion, which suspends all previous abort conditions, may be given by an intersection of signals 200, 205, as shown on grid line 5 in FIG. 2 by way of example. If signals 200, 205 intersect, the calculation of the transit time differences is aborted.

Once the calculation of the quantity $\{dt_0, dt_1, dt_2 \ldots\}$ has been concluded, a relevant transit time difference may be extracted therefrom in a next step. For example, the maximum transit time difference may be calculated from the quantity of calculated signal transit time differences $dt_1$. Furthermore, a mean or a median may be calculated from the ascertained signal transit times $\{dt_0, dt_1, dt_2 \ldots\}$.

After a transit time difference between two signals has been ascertained adaptively and with great accuracy, this information may be further processed in an algorithm. For example, a subdivision into different types of crashes, e.g., for detecting a frontal crash, or different impact classes, e.g., for pedestrian protection detection, may take place with the aid of the transit time differences. These impact classes may reflect a distance from an impact in the middle. An impact in the middle causes, for example, only a slight transit time difference, whereas a peripheral impact goes hand in hand with an increased transit time difference between the two signals.

Figure 3:
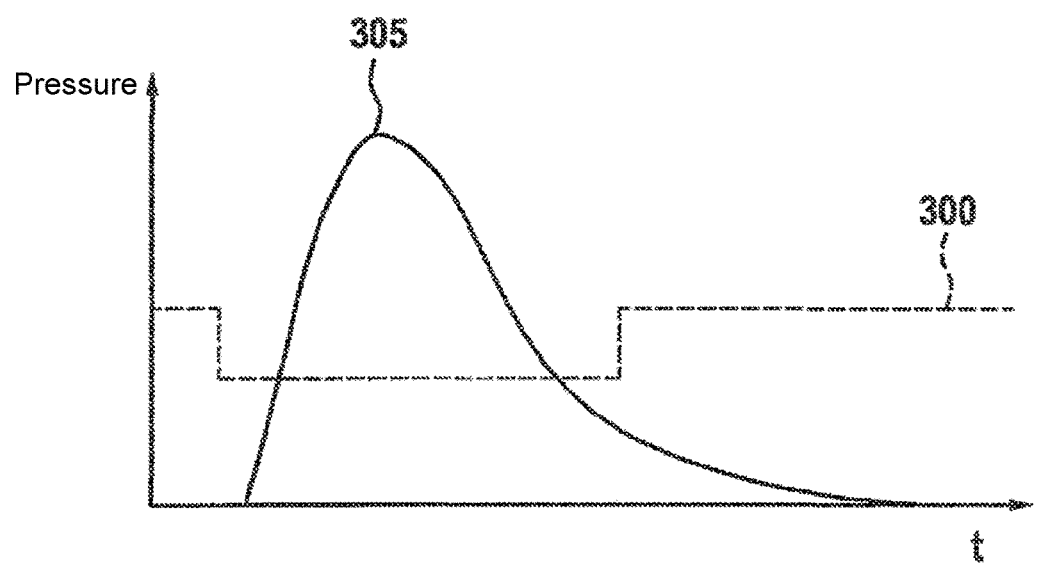
FIG. 3 shows a diagram for depicting a change in a triggering threshold according to one exemplary embodiment of the present invention.

By using the impact classes or the transit time differences, an adaptation of feature thresholds or signals may be subsequently carried out in the algorithm. The adaptation of the thresholds is depicted in FIG. 3 using a preprocessed pressure signal 305 as an example. The threshold adaptation may take place in a fixed time window, for example, for as long as the algorithm is in the active state. The adaptation of the thresholds may take place in both directions as a function of an impact position, depending on how this is dictated by a vehicle structure at this point.

FIG. 3 shows a diagram for depicting a change in a triggering threshold 300 according to one exemplary embodiment of the present invention. The curve over time of a pressure signal 305 is depicted in the diagram, by way of example. This is one of the two signals 200, 205 depicted in FIG. 2, for example. Triggering threshold 300 is marked with a line extending in parallel to the x-axis. Triggering threshold 300 has been lowered in the area of a time window in order to adapt the threshold.

Instead of the threshold value adaptation, a switch to other triggering criteria may be provided. For example, in the case of outlying impacts, processed sensor features other than those used in the case of impact positions in the middle may be used for generating a triggering decision.

According to a further exemplary embodiment, certain squibs are fired only in the event of a certain impact position. For example, only one airbag, which is on the relevant side, of a total of two separate pedestrian airbags, which prevent contact of a pedestrian with an A-pillar of a vehicle, may be fired in the event of peripheral impacts. In the case of impacts in the middle, however, both airbags may be fired.

Similarly, within the scope of detecting frontal crashes, certain squibs may be fired only in the event of a certain type of crash, for example, head airbags facing the crash, only in the event of a highly asymmetrical crash having great transit time differences.

Figure 4A:
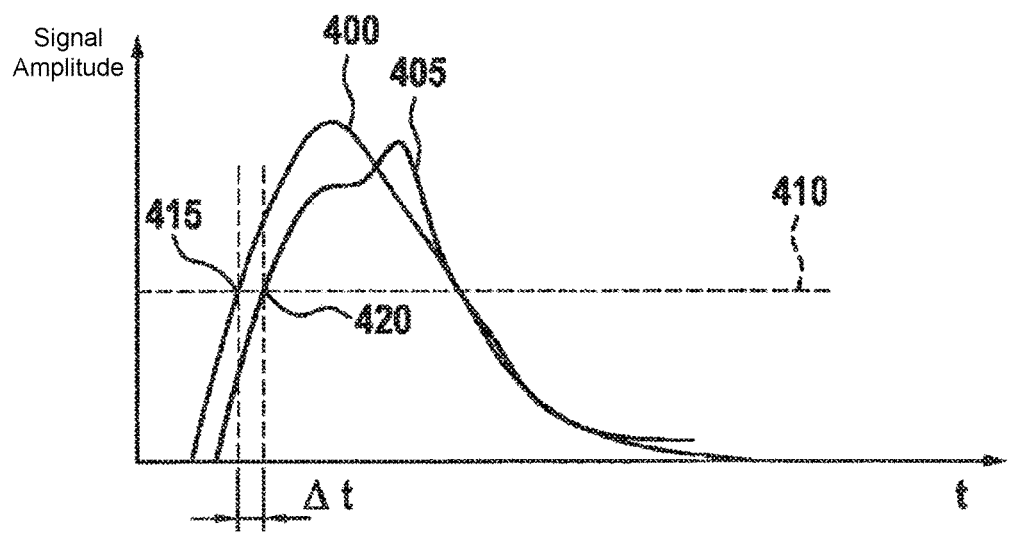
FIGS. 4a, 4b show diagrams for depicting a transit time-based comparison between two signals as a function of different signal strengths.
Figure 4B:
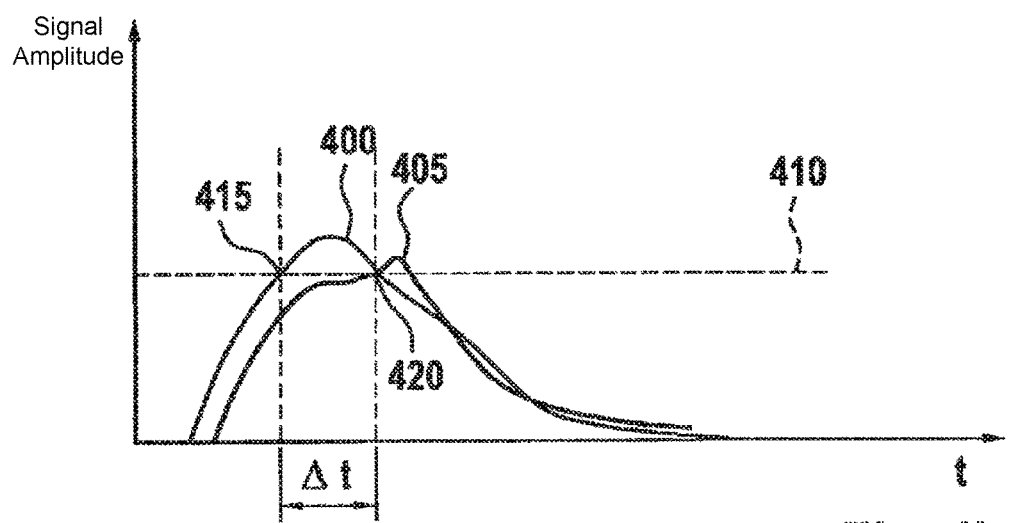

FIGS. 4a and 4b show diagrams for depicting a transit time-based comparison between two signals as a function of different signal strengths. Signals 400, 405 each have a curved course over time. A predefined threshold 410 for measuring a transit time difference between signals 400, 405 is indicated by a line extending in parallel to an x-axis. The line of threshold 410 intersects the curve of signal 400 at a first intersection point 415 and intersects the curve of signal 405 at a second intersection point 420. Intersection points 415, 420 are each located in a linearly rising curve area of signals 400, 405. An interval in the x-direction between a point in time assigned to first intersection point 415 and a point in time assigned to second intersection point 420 represents the transit time difference between signals 400, 405.

In contrast to FIG. 4a, signals 400, 405 shown in FIG. 4b each have a substantially lower amplitude, although the shape of the curve is similar to that in FIG. 4a. Threshold 410 is identical in the two FIGS. 4a and 4b, however. The time lag between the points in time assigned to intersection points 415, 420 in FIG. 4b is therefore substantially greater than in FIG. 4a.

Instantaneous transit time-based signal comparisons utilize a fixed threshold at which the transit time difference is measured. In this case, the threshold may tend to lie in a lower area or in an upper area of the rising edge, depending on the intensity of the impact. This may possibly result in inaccuracies in the transit time measurement.

The two situations depicted in FIGS. 4a and 4b are qualitatively similar, although they differ with respect to a signal strength. Since threshold 410 for the transit time measurement lies in the rising edge one time, but in the area of a maximum the other time, substantially different values for the ascertained transit time difference may result.

In addition, the resolution of the transit time difference in present systems is limited to an algorithm time period, generally to 0.5 ms. A finer time period, of the type provided according to one exemplary embodiment of the present invention, may be advantageous for a sufficiently accurate classification.

Figure 5:
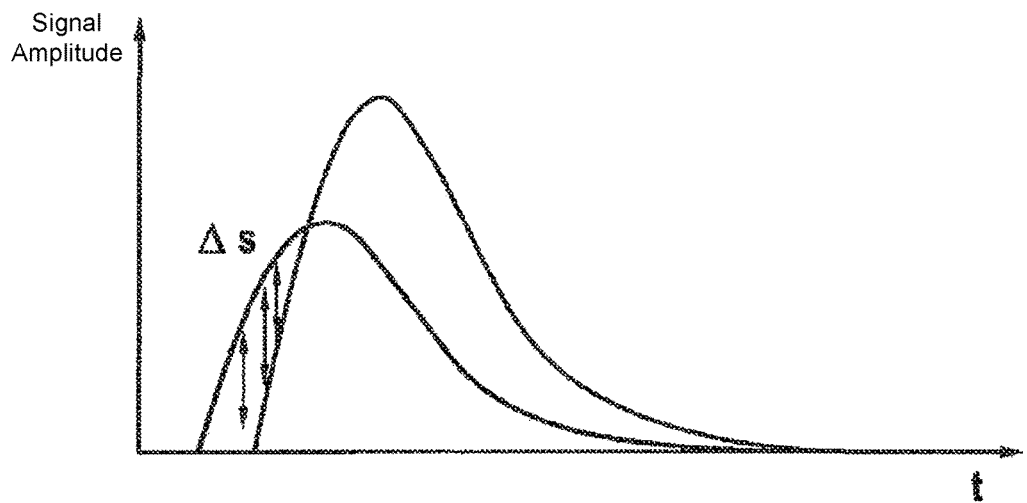
FIG. 5 shows a diagram for depicting an amplitude-based comparison between two signals.

FIG. 5 shows a diagram for depicting an amplitude-based comparison between two signals.

Figure 6:
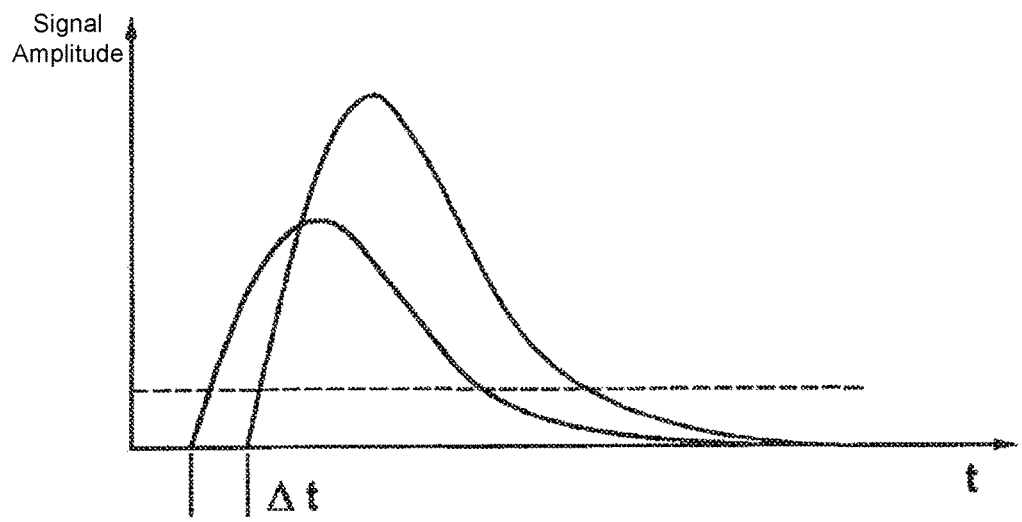
FIG. 6 shows a diagram for depicting a transit time-based comparison between two signals.

FIG. 6 shows a diagram for depicting a transit time-based comparison between two signals.

Sensor comparisons are mostly based on an evaluation of a signal difference between preprocessed sensor data from the relevant sensors, such as, for example, filtered signals, window integrals, integrals, or other processings. In the normal case, the signal difference is evaluated on the basis of amplitude, as shown in FIG. 5. In this case, the signal difference is evaluated and further processed in one or multiple computing cycles. For example, the signal difference is summed or averaged over a few cycles. A classification may then be carried out based on this amplitude-based signal difference.

Alternatively, the signal difference may also be evaluated on the basis of transit time, as depicted in FIG. 6. In this case, a transit time difference between the two sensors is measured and subsequently evaluated with respect to a fixed amplitude level or threshold.

FIGS. 5 and 6 show, by way of example, the principles of previous amplitude-based and transit time-based signal comparisons. In this case, the transit time-based signal comparison takes place across a fixed threshold.

Figure 7:
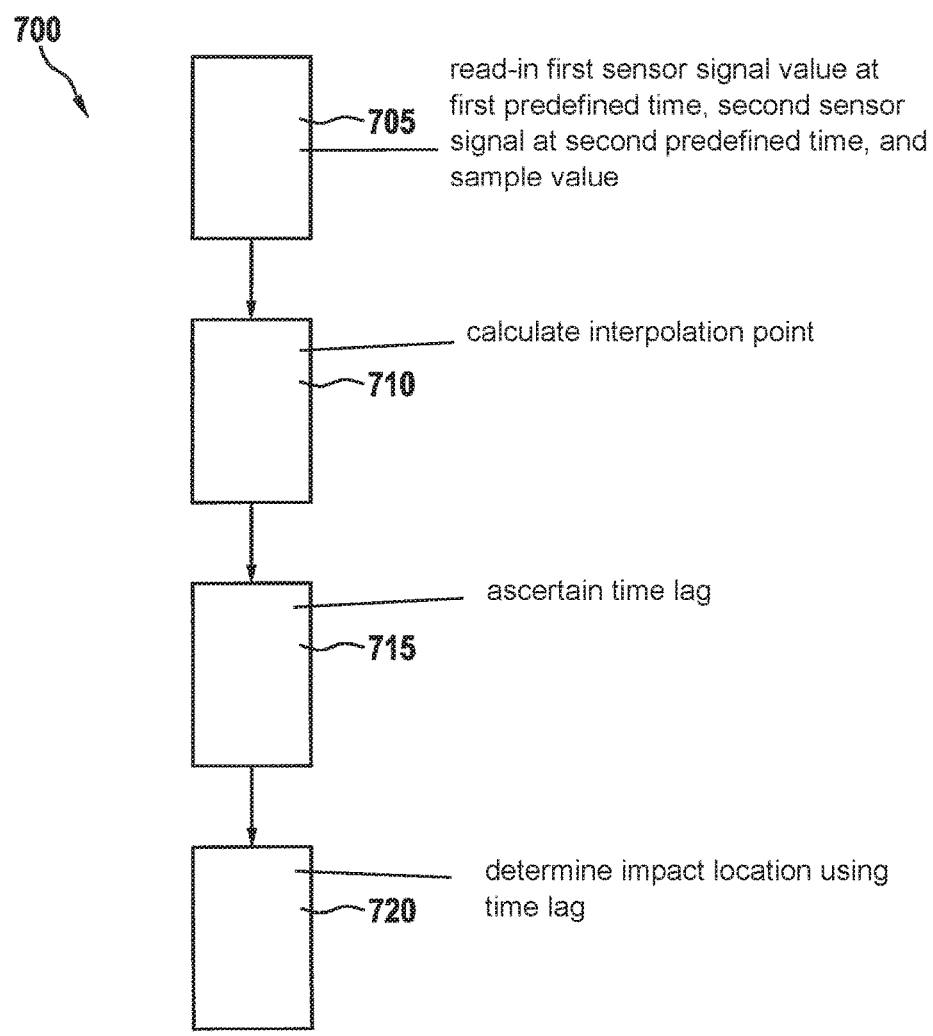
FIG. 7 shows a flow chart of a method for determining an impact location of an object on a vehicle according to one exemplary embodiment of the present invention.

FIG. 7 shows a flow chart of a method 700 for determining an impact location of an object on a vehicle according to one exemplary embodiment of the present invention. Method 700 includes a step of reading in 705 a first sensor signal value of a first sensor of the vehicle at a predefined first point in time, a second sensor signal value of the first sensor at a predefined second point in time following the first point in time, and a sample value of a second sensor of the vehicle at a third point in time following the second point in time. One exemplary embodiment of the present invention is favorable, in which the values of the first sensor are buffered and the sample value is determined (namely, that the sample value from the second sensor lies between the first and the second sensor signal values of the first sensor). The calculation of an interpolation point on the basis of the first sensor signal value and the second sensor signal value by using the sample value takes place in a step 710. In this case, at least one component of the interpolation point corresponds to the sample value. In addition, method 700 includes a step of ascertaining 715 a time lag between an interpolation instant assigned to the interpolation point, and the third point in time. Finally, the time lag is used in a step of determining 720 the impact location of the object.

According to one exemplary embodiment of the present invention, the measurement of a transit time difference between two sensor signals is carried out adaptively. In this case, an evaluation area for the transit time measurement in a rising signal edge is adapted to a signal strength. This is attained in that a repeated measurement of the transit time difference takes place starting from a low first threshold for determining the transit time difference. The rising edge of the signals may therefore be precisely measured.

From the set of transit time differences obtained in this way, a representative transit time difference may be ascertained by statistical methods.

In addition, the accuracy may be improved to an accuracy substantially below the algorithm time period by interpolation between sensor values.

Therefore, it is possible to determine the transit time difference in a particularly accurate and robust way and, therefore, to carry out a particularly accurate and robust detection of an impact location of objects, e.g., on a bumper of a vehicle, within the context of a pedestrian protection system or a type of crash, e.g., in association with airbag triggering algorithms. In this way, a robustness of a triggering decision within the algorithm may be increased.

Figure 8:
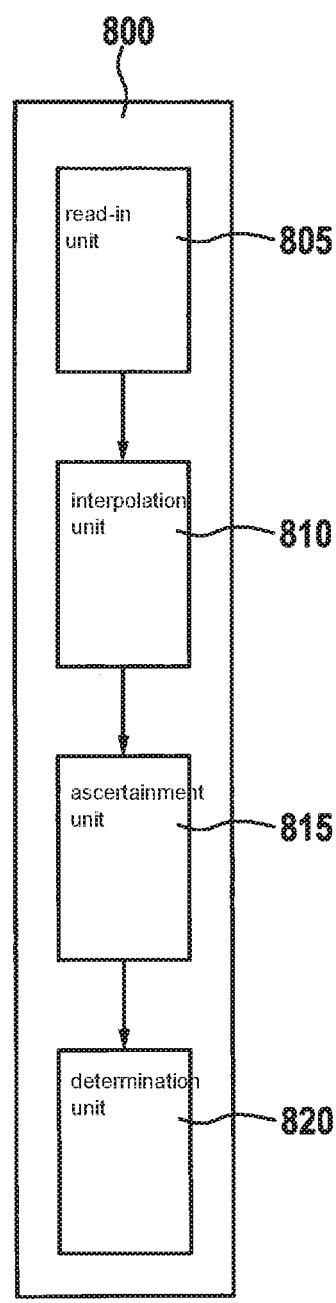
FIG. 8 shows a block diagram of a device for carrying out a method according to one exemplary embodiment of the present invention.

FIG. 8 shows a block diagram of a device 800 for carrying out a method according to one exemplary embodiment of the present invention. Device 800 may be, for example, device 105 shown in FIG. 1. Device 800 includes a read-in unit 805, an interpolation unit 810, an ascertainment unit 815, and finally a determination unit 820.

Read-in unit 805 is designed for reading in a first sensor signal value of a first sensor of the vehicle at a predefined first point in time, a second sensor signal value of the first sensor at a predefined second point in time following the first point in time, and a sample value of a second sensor of the vehicle at a third point in time following the second point in time. One exemplary embodiment of the present invention is favorable, in which the values from the first sensor are buffered in a memory and the sample value is determined (namely, that the sample value from the second sensor lies between the first and the second sensor signal values of the first sensor).

Interpolation unit 810 is designed for calculating an interpolation point on the basis of the first sensor signal value and the second sensor signal value by using the sample value, at least one component of the interpolation point corresponding to the sample value.

Ascertainment unit 815 is designed for ascertaining a time lag between an interpolation instant assigned to the interpolation point, and the third point in time.

Determination unit 820 is designed for determining the impact location of the object by using the time lag.

The exemplary embodiments described and shown in the figures are selected merely by way of example. Different exemplary embodiments may be combined with one another entirely or with respect to individual features. One exemplary embodiment may also be supplemented by features of a further exemplary embodiment.

Furthermore, the method steps presented here may be repeated and may be carried out in a sequence other than that described.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

What is claimed is:

1. A method for determining an impact location of an object on a vehicle, comprising:
   reading in a first sensor signal value of a first sensor of the vehicle at a predefined first point in time, a second sensor signal value of the first sensor at a predefined second point in time following the first point in time, and a sample value of a second sensor of the vehicle at a third point in time following the second point in time;
   based on the sample value of the second sensor, interpolating the first sensor signal value of the first sensor and the second sensor signal value of the first sensor to thereby obtain an estimate of an interpolation instant between the predefined first point in time and the predefined second point in time at which an interpolated sensor signal value of the first sensor, that is estimated to be between the first and second sensor signal values of the first sensor, corresponds to the sample value of the second sensor;
   ascertaining a time lag between the interpolation instant and the third point in time; and
   determining the impact location of the object based on the ascertained time lag.

2. The method as recited in claim 1, wherein the ascertaining of the time lag includes:
   determining (a) a first period of time between the second point in time and the third point in time and (b) a second period of time between the interpolation instant and the second point in time; and
   subsequent to the determination of the first and second periods of time, constructing the time lag by linking the first period of time to the second period of time.

3. The method as recited in claim 1, wherein, in the step of ascertaining, the time lag is ascertained at least one of: i) by using a first ratio of a difference value formed from the second sensor signal value and the sample value with respect to the difference of the second sensor signal value and the first sensor signal value, and ii) by using a second ratio of a period of time between the interpolation instant and the second point in time with respect to a period of time between the first point in time and the second point in time, the first ratio corresponding to the second ratio.

4. The method as recited in claim 1, wherein, in the step of ascertaining, the time lag between the interpolation instant and the third point in time is ascertained based on a time lag that is between the interpolation instant and the second point in time and that is determined as an integral multiple of one of a plurality of predefined grid intervals into which a time lag between the first point in time and the second point in time is subdivided.

5. The method as recited in claim 1, further comprising:
   detecting a predefined threshold value being exceeded by at least one of a signal value of the first sensor and a signal value of the second sensor, wherein at least one of the first sensor signal value, the second sensor signal value, and the sample value is read in, in the step of reading in, in response to the detection of the threshold value being exceeded.

6. The method as recited in claim 5, further comprising:
   storing a sensor signal reference value at a predefined reference point in time preceding the first point in time, the sensor signal reference value representing a sensor signal value of the first sensor, which is below the threshold value.

7. The method as recited in claim 1, wherein execution of at least one step of the method is at least one of aborted and prevented when at least one predefined abort criterion has been met.

8. The method as recited in claim 1, further comprising:
   assigning an impact of the vehicle to at least one predefined impact category as a function of at least one of the time lag and the impact location.

9. The method as recited in claim 1, further comprising:
   changing a triggering threshold for triggering an occupant protection device of the vehicle as a function of at least one of the time lag and the impact location.

10. The method as recited in claim 1, further comprising:
   providing an activation signal for activating at least one occupant protection device of the vehicle as a function of at least one of the time lag and the impact location.

11. The method as recited in claim 1, wherein:
   in the step of reading in, a third sensor signal value of the first sensor is read in at the third point in time and a further sample value of the second sensor is read in at a fourth point in time following the third point in time;
   the step of interpolating further includes, based on the further sample value, interpolating the second sensor signal value of the first sensor and the third sensor signal value of the first sensor to thereby obtain an estimate of a further interpolation instant between the second point in time and the third point in time at which a further interpolated sensor signal value of the first sensor corresponds to the further sample value;
   in the step of ascertaining, a further time lag between the further interpolation instant and the fourth point in time is ascertained; and the determination of the impact location is further based on the further time lag.

12. The method as recited in claim 11, wherein, in the step of ascertaining, at least one of a mean and a maximum value is formed at least from at least one of the time lag and the further time lag, the impact location being determined, in the step of determining, by using the at least one of the mean and the maximum value.

13. A device comprising an electronic processor, wherein:
the electronic processor includes circuitry programmed, by at least one of hardwired programming and software, with a program that is executable by the processor and that, when executed by the processor, causes the processor to perform a method for determining an impact location of an object on a vehicle; and
the method includes:
reading in a first sensor signal value of a first sensor of the vehicle at a predefined first point in time, a second sensor signal value of the first sensor at a predefined second point in time following the first point in time, and a sample value of a second sensor of the vehicle at a third point in time following the second point in time;
based on the sample value of the second sensor, interpolating the first sensor signal value of the first sensor and the second sensor signal value of the first sensor to thereby obtain an estimate of an interpolation instant between the predefined first point in time and the predefined second point in time at which an interpolated sensor signal value of the first sensor, that is estimated to be between the first and second sensor signal values of the first sensor, corresponds to the sample value of the second sensor;
ascertaining a time lag between the interpolation instant and the third point in time; and
determining the impact location of the object based on the ascertained time lag.

14. A non-transitory machine-readable memory medium on which is stored a computer program for determining an impact location of an object on a vehicle, the computer program, when executed by a processing unit, causing the processing unit to perform:
reading in a first sensor signal value of a first sensor of the vehicle at a predefined first point in time, a second sensor signal value of the first sensor at a predefined second point in time following the first point in time, and a sample value of a second sensor of the vehicle at a third point in time following the second point in time;
based on the sample value of the second sensor, interpolating the first sensor signal value of the first sensor and the second sensor signal value of the first sensor to thereby obtain an estimate of an interpolation instant between the predefined first point in time and the predefined second point in time at which an interpolated sensor signal value of the first sensor, that is estimated to be between the first and second sensor signal values of the first sensor, corresponds to the sample value of the second sensor;
ascertaining a time lag between the interpolation instant and the third point in time; and
determining the impact location of the object based on the ascertained time lag.

15. A device comprising an electronic processor, wherein:
the electronic processor includes circuitry programmed, by at least one of hardwired programming and software, with a program that is executable by the processor and that, when executed by the processor, causes the processor to perform a method for determining an impact location of an object on a vehicle; and the method includes:
periodically, at each of a plurality of sampling times between each pair of consecutive sampling times of which there is a lapse of a sampling interval, sampling each of a first sensor and a second sensor for a respective sensor signal, thereby obtaining a first sampled signal of the first sensor at a first of the plurality of sampling times, a second sampled signal of the first sensor at a second of the plurality of sampling times, and a first sampled signal of the second sensor at a third of the plurality of sampling times, wherein respective values of each of the first sampled signal of the first sensor, the second sampled signal of the first sensor, and the first sampled signal of the second sensor differ; interpolating the first and second sampled signals of the first sensor and their respective sampling times, thereby determining an interpolation instant at which occurs an interpolated signal whose value equals the value of the first sampled signal of the second sensor, wherein the interpolation instant is during one of the sampling intervals, is not at any of the sampling times, and is between the first and second sampling times; determining a time lag between the interpolation instant and the third sampling time; and determining the impact location based on the time lag.

16. A method for determining an impact location of an object on a vehicle, comprising:
reading in a first sensor signal value of a first sensor of the vehicle at a predefined first point in time, a second sensor signal value of the first sensor at a predefined second point in time following the first point in time, and a sample value of a second sensor of the vehicle at a third point in time following the second point in time;
interpolating the first sensor signal value of the first sensor and the second sensor signal value of the first sensor, based on the sample value, thereby obtaining an interpolated sensor signal value of the first sensor at an interpolation instant, wherein the interpolated sensor signal value of the first sensor corresponds to the sample value of the second sensor;
ascertaining a time lag between the interpolation instant and the third point in time; and
determining the impact location of the object based on the ascertained time lag;
wherein at least one of the following:
(a) in the step of ascertaining, the time lag between the interpolation instant and the third point in time is ascertained at least one of:
(i) by using a first ratio of a difference value formed from the second sensor signal value and the sample value with respect to a difference of the second sensor signal value and the first sensor signal value;
(ii) by using a second ratio of a period of time between the interpolation instant and the second point in time with respect to a period of time between the first point in time and the second point in time, the first ratio corresponding to the second ratio; and
(iii) based on a time lag that is between the interpolation instant and the second point in time and that is determined as an integral multiple of one of a plurality of predefined grid intervals into which a time lag between the first point in time and the second point in time is subdivided;

(b) execution of at least one step of the method is at least one of aborted and prevented when at least one predefined abort criterion has been met; and (c) the following:
   (i) in the step of reading in, a third sensor signal value of the first sensor is read in at the third point in time and a further sample value of the second sensor is read in at a fourth point in time following the third point in time;
   (ii) the step of interpolating further includes interpolating the second sensor signal value of the first sensor and the third sensor signal value of the first sensor based on the further sample value, thereby obtaining a further interpolated sensor signal value of the first sensor at a further interpolation instant, the further interpolated sensor signal value of the first sensor corresponding to the further sample value of the second sensor;
   (iii) in the step of ascertaining, a further time lag between the further interpolation instant and the fourth point in time is ascertained; and
   (iv) the determination of the impact location is further based on the further time lag.

17. The method as recited in claim 16, wherein, in the step of ascertaining, the time lag between the interpolation instant and the third point in time is ascertained by using the first ratio.

18. The method as recited in claim 16, wherein, in the step of ascertaining, the time lag between the interpolation instant and the third point in time is ascertained by using the second ratio.

19. The method as recited in claim 16, wherein, in the step of ascertaining, the time lag between the interpolation instant and the third point in time is ascertained based on the time lag that is between the interpolation instant and the second point in time and that is determined as the integral multiple of the one of the plurality of predefined grid intervals.

20. The method as recited in claim 16, wherein the execution of the at least one step of the method is at least one of aborted and prevented when the at least one predefined abort criterion has been met.

21. The method as recited in claim 16, wherein:
   in the step of reading in, the third sensor signal value of the first sensor is read in at the third point in time and the further sample value of the second sensor is read in at the fourth point in time following the third point in time;
   the step of interpolating further includes the interpolating the second sensor signal value of the first sensor and the third sensor signal value of the first sensor based on the further sample value, thereby obtaining the further interpolated sensor signal value of the first sensor at the further interpolation instant, the further interpolated sensor signal value of the first sensor corresponding to the further sample value of the second sensor;
   in the step of ascertaining, the further time lag between the further interpolation instant and the fourth point in time is ascertained; and
   the determination of the impact location is further based on the further time lag.

22. The method as recited in claim 21, wherein, in the step of ascertaining, at least one of a mean and a maximum value is formed at least from at least one of the time lag and the further time lag, the impact location being determined, in the step of determining, by using the at least one of the mean and the maximum value.

* * * * *